R. M. DECKER.
MACHINE FOR MANUFACTURING ENVELOPS.
APPLICATION FILED AUG. 16, 1912.
1,062,954.
Patented May 27, 1913.
4 SHEETS—SHEET 1.
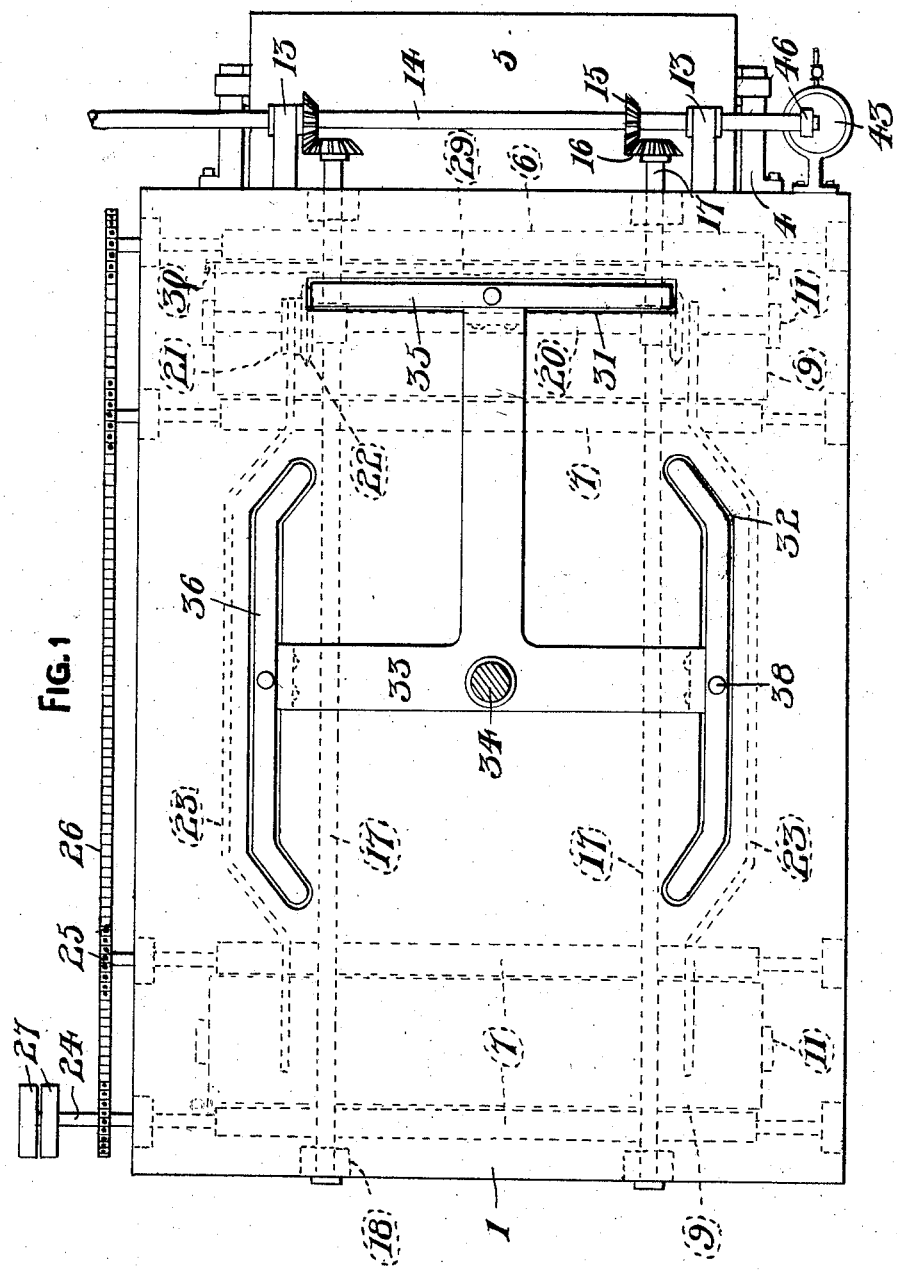
WITNESSES:
J. P. Appleman
Ralph C. Evert
INVENTOR.
Robert M. Decker
BY
N. C. Evert
ATTORNEYS.

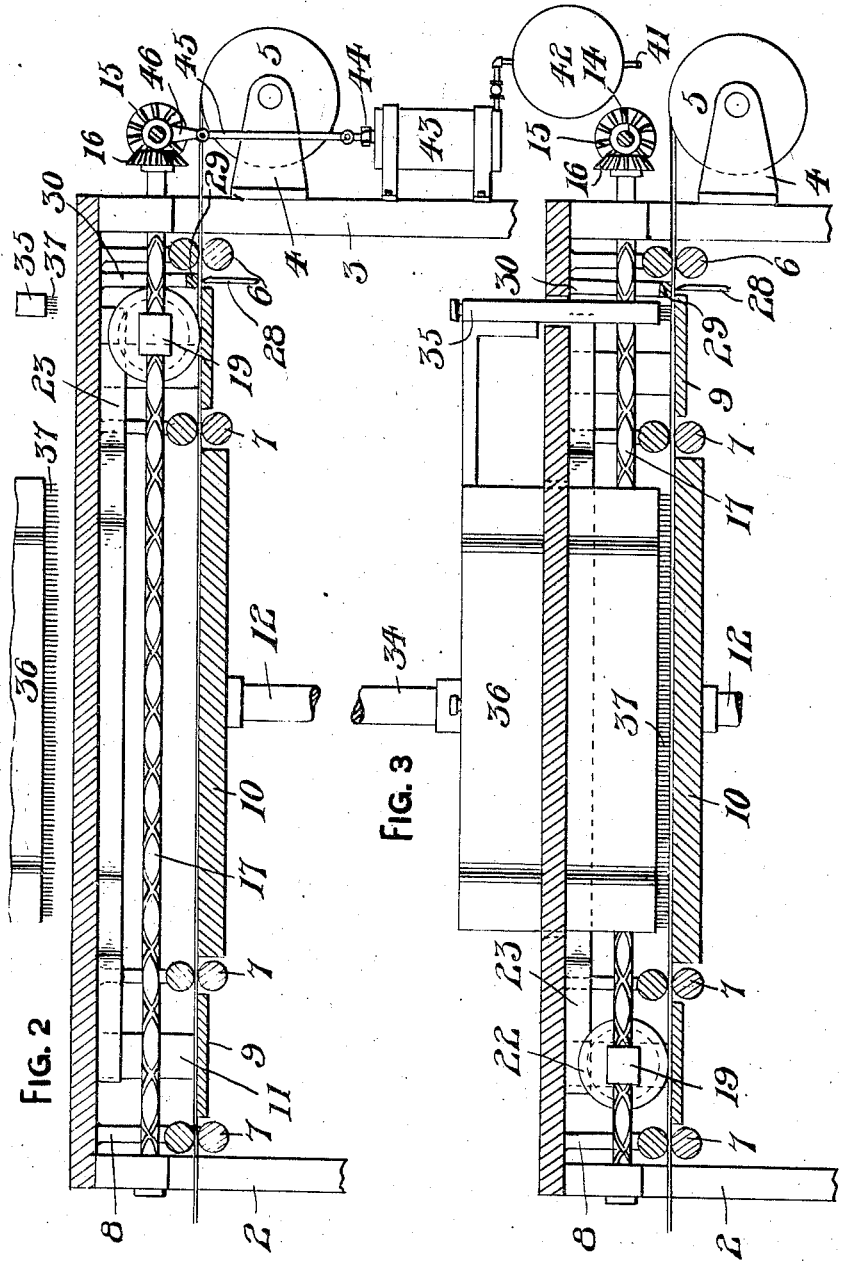

R. M. DECKER.
MACHINE FOR MANUFACTURING ENVELOPS.
APPLICATION FILED AUG. 16, 1912.
1,062,954.
Patented May 27, 1913.
4 SHEETS—SHEET 3.
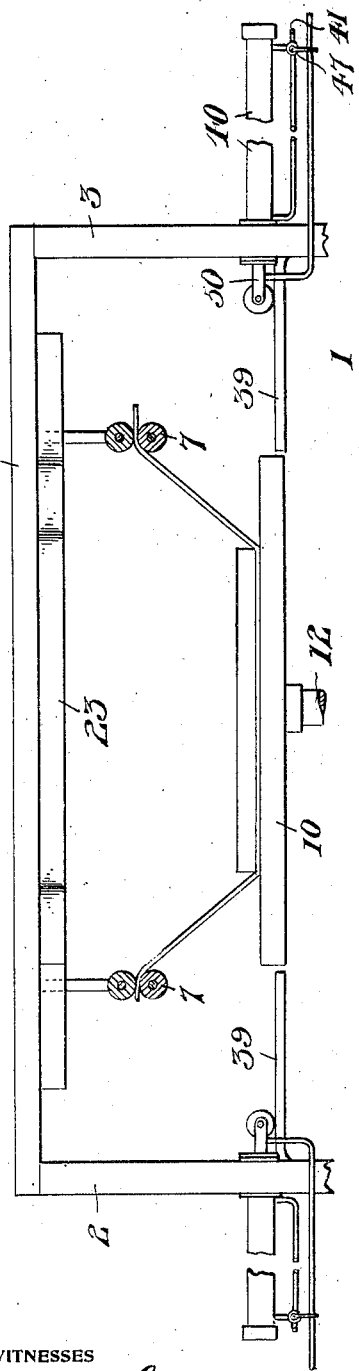
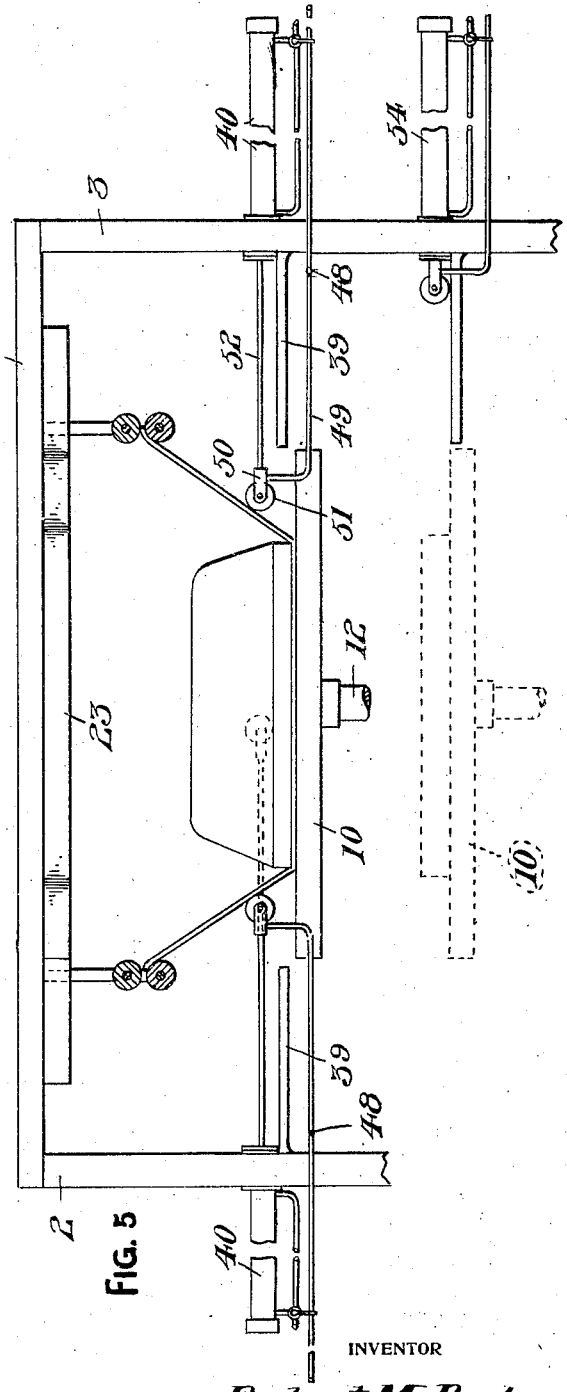

R. M. DECKER.
MACHINE FOR MANUFACTURING ENVELOPS.
APPLICATION FILED AUG. 16, 1912.
1,062,954.
Patented May 27, 1913.
4 SHEETS—SHEET 4.
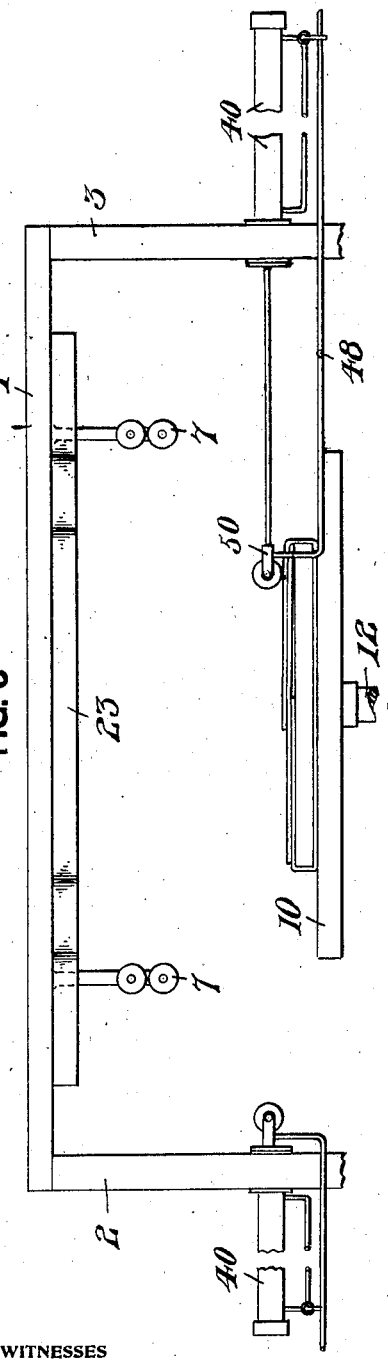
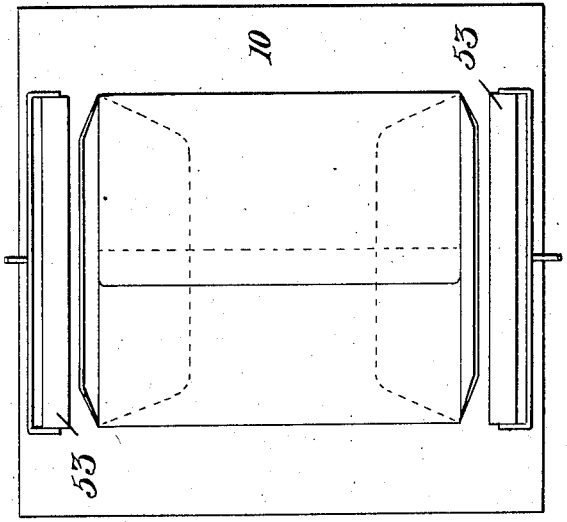
WITNESSES
INVENTOR
Robert M. Decker
BY
ATTORNEYS

UNITED STATES PATENT OFFICE.

ROBERT MOORE DECKER, OF WEST NEWTON, PENNSYLVANIA.

MACHINE FOR MANUFACTURING ENVELOPS.

1,062,954.   Specification of Letters Patent.   Patented May 27, 1913.

Application filed August 16, 1912. Serial No. 715,410.

*To all whom it may concern:*

Be it known that I, ROBERT MOORE DECKER, a citizen of the United States of America, residing at West Newton, in the county of Westmoreland and State of Pennsylvania, have invented certain new and useful Improvements in Machines for Manufacturing Envelops, of which the following is a specification, reference being had therein to the accompanying drawing.

This invention relates to a machine for manufacturing envelops, and more particularly large envelops, wrappers or inclosures for magazines and other literature adapted to be sent by mail or express.

The primary object of my invention is to provide a machine of the above type wherein positive and reliable means are employed, as hereinafter set forth, for expeditiously and economically manufacturing envelops and wrappers.

Another object of this invention is to provide a machine of the above type wherein simple and effective means are resorted to for wrapping and sealing magazines or other matters placed in position in the machine.

A further object of this invention is to provide a continuously and automatically operated machine of the above type for wrapping and inclosing various kinds of matter, parts of the machine being successively operated for folding a wrapper, sealing the same and discharging the wrapped article from the machine.

A still further object of this invention is to provide a strong and durable wrapping machine that can be advantageously used by large publishing houses, the machine accomplishing automatically what has been heretofore performed by hand, consequently saving labor and money.

With the above and other objects in view, the invention resides in a novel construction, combination and arrangement of parts to be hereinafter specifically described and then claimed.

Reference will now be had to the drawings, wherein like numerals denote corresponding parts throughout the several views, in which:—

Figure 1 is a plan of the machine. Fig. 2 is a longitudinal sectional view of a portion of the machine. Fig. 3 is a similar view illustrating the moistening device in action. Fig. 4 is a side elevation of a portion of the machine showing an article in the machine in position to be wrapped. Fig. 5 is a similar view illustrating the article as partially wrapped, also showing an ejector. Fig. 6 is a similar view showing the article completely wrapped, and Fig. 7 is a plan of a movable platform forming part of the machine, showing an article partially wrapped.

In describing my invention by aid of the drawings above referred to, I desire to point out that I intend said views as merely illustrative of an example whereby my invention may be applied in practice, and I do not limit my claims to the precise arrangements or constructions of the parts indicated. The following description is therefore to be construed broadly, as including substitute arrangement and construction which are the obvious equivalent of those shown.

The drawings show a platform 1 that is rectangular in plan, said platform being supported by uprights 2 and 3. The uprights 3 are provided with bearings 4 for a roll of paper 5. The paper from the roll 5 is adapted to pass between the uprights 3 and 2, beneath the platform 1, said paper passing between sets of transverse rolls 6 and 7 that are revolubly supported by hangers 8 arranged at the longitudinal side edges of the platform 1. The paper also passes over stationary platforms 9 and a movable platform 10. The stationary platforms 9 are supported by hangers 11, carried by the platform 1. The movable platform 10 is carried by a plunger 12 and said plunger can be raised and lowered by a hydraulic, hand, treadle, or any other suitable means (not shown). The forward end of the platform 1 is provided with bearings 13 for a driven shaft 14 that can be operated by a motor or from any suitable source of power. The driven shaft 14, adjacent to the bearings 13, is provided with beveled gear wheels 15 meshing with beveled gear wheels 16 mounted upon the forward ends of longitudinal double spiral feed screws 17 that are revolubly supported in bearings 18, carried by the platform 1, at the forward and rear ends thereof. The feed screws 17 are adapted to shift blocks 19 back and forth beneath the platform 1 and said blocks are connected together by a transverse rod 20 that has the ends thereof protruding beyond said blocks. Slidably and rotatably mounted upon the ends of the rod 20 are grooved guide wheels 21 having integral cutter wheels 22. The cutter wheels 22 engage the paper as it passes over the platforms 9 and 10, said cutter wheels cutting the longitudinal edges of the paper and producing end flaps, as will hereinafter appear. The grooved guide wheels 21 engage depending guide rails 23 carried by the platform 1, said guide rails determining the shape of the end flaps to be cut at the side edges of the paper. In order that the paper can be fed over the platforms 9 and 10, the rolls 6 and 7 have the shafts 24 thereof provided with sprocket wheels 25 and passing over said sprocket wheels is an endless sprocket chain 26 that causes said rolls to revolve in unison. One of the shafts 24 of the rearmost set of rolls 7 is provided with belt wheels 27, whereby the sets of rolls can be driven.

Located adjacent to the set of rolls 6 is a reciprocatory knife 28 that engages the underside of the paper and cuts the paper into desired lengths. Above the knife 28 there is located a transverse bar 29 carried by hangers 30 connected to the platform 1. The paper passes between the knife and the bar 29 and said bar supports the paper during the cutting action of the knife. This knife can be automatically operated by any suitable means. The platform 1 is provided with a transverse slot 31, adjacent to the forward end thereof, and with longitudinal flap slots 32. The slots 32 are arranged adjacent to the guide rails 23 and conform in plan to the shape of said rails.

Movable above the platform 1 is a T shaped head 33 carried by a plunger 34 that can be operated similar to the plunger 12. The ends of the head 33 are provided with paste applying devices 35 and 36 adapted to be moved through the slots 31 and 32 and are utilized for applying paste to the flap. The paste applying devices 35 and 36 are in the form of reservoirs adapted to contain a paste or mucilage which is applied to the paper through the medium of brushes 37, carried by the lower edges of the devices 35 and 36. The devices 35 and 36 have filling openings that are normally closed by screw caps 38.

The uprights 2 and 3, below the platform 1, are provided with inwardly projecting roller supports 39 and outwardly projecting hydraulic cylinders 40. The hydraulic cylinders are of the ordinary and well known type and said cylinders are connected by a pipe 41 to an air tank 42 into which air is pumped by a pump 43, carried by one of the uprights 3. The pump 43 is also of the ordinary and well known type and the piston 44 of said pump is connected by a pitman 45 to a crank 46 mounted upon the end of the driven shaft 14. The supply of air to the hydraulic cylinders 40 is automatically controlled by valves 47 having the valve stems thereof tripped by extensions 48, carried by a longitudinal rod 49 connected to a roller bearing 50. The roller bearing 50 has a revoluble wrapping roller 51 and said bearing is carried by the outer end of the piston rod 52. Besides the wrapping rollers shown in Figs. 4 and 5, there are two side rollers 53 that are shown in Fig. 7, said rollers being operated similar to the rollers 51.

The uprights 3 support another hydraulic cylinder 54 below the cylinder 40, the cylinder 54 being equipped similar to the cylinder 40 and constituting an ejector. When the platform 10 is sufficiently lowered, the cylinder 54 can be placed in operation to eject the wrapped and sealed article from the platform.

The machine herein described is adapted to be continuously operated and the knife 28 and the cutter wheels 22 sever the paper as it passes from the roll 5 over the platforms 9 and 10.

The operation of the driven shaft 14 can be reversed whereby the cutter wheels 22 will be moved back and forth, and any suitable mechanism can be employed for controlling the movement of the shafts 14 and 24. During the movement of the cutter wheels 22, the paper is held stationary upon the platform 10 and while being held, the devices 35 and 36 can be lowered to apply adhesive to the edges of the paper. After the paste applying devices and the cutter wheels have been restored to their normal position, the shafts 24 are placed in operation and the platform 10 is lowered. The severed end of the piece of paper is moved to the first set of rolls 7 and then there is a cessation in the operation of the shafts 24 until the platform is restored to its normal position. As the platform 10 is lowered, the magazine or article to be wrapped is placed upon the cut piece of paper, and the paper is therefore weighted down on the platform 10 and the ends of the piece of paper drawn through the set of rolls 7, as best shown in Fig. 4. When the platform 10 passes below the roller supports 39, as best shown in Fig. 5, there is a cessation in the movement of said platform and the hydraulic cylinders 40 are placed in operation, whereby the rollers 51 and 53 can move into engagement with the edges of the piece of paper and fold the edges of the paper upon the article. The hydraulic cylinder 40 at the rear end of the machine is operated in advance of the hydraulic cylinder at the forward end thereof, whereby the forward end of the piece of paper will be folded onto and sealed to the rear end of the piece of paper. The roller 51 is operated in advance of the rollers 53, and the rollers 53 close and seal the end flap upon the wrapper. The wrapping and sealing having been accomplished and the rollers 51 and 53 restored to their normal position, the platform 10 is further lowered whereby the article upon said platform will aline with the ejector 54, which is now operated to eject the article from the platform 10. The platform 10 is then restored to its normal position, as best shown in Fig. 2, the shaft 24 placed in operation and after the paper has been fed to the rearmost set of rolls 7, the shaft 24 is stopped and the operation as above described repeated.

It is thought that the operation and utility of the machine will be apparent without further description, and I would have it understood that the principles of my invention can be embodied in a machine for wrapping various kinds of food stuffs and other material.

What I claim is:—

1. A machine of the type described comprising a platform, means for automatically feeding paper beneath said platform, a movable platform supporting the paper beneath the first mentioned platform, paste applying devices movable through the first mentioned platform for applying paste to said paper, cutter wheels movable beneath said first mentioned platform for cutting said paper, and wrapping rollers adapted to move onto said movable platform and wrap and seal the cut and moistened piece of paper.

2. A machine of the type described comprising a platform, means for automatically feeding paper beneath said platform, a movable platform supporting the paper beneath the first mentioned platform, paste applying devices movable through the first mentioned platform for applying paste to said paper, cutter wheels movable beneath said first mentioned platform for cutting said paper, and wrapping rollers adapted to move onto said movable platform and wrap and seal the cut and moistened piece of paper, and an ejector located beneath one of said wrapping rollers and adapted to eject the wrapped paper from said movable platform.

3. A machine of the type described comprising a main platform, means for feeding paper beneath said platform, paste applying devices movable through said platform and adapted for applying paste to the paper beneath said platform, a movable platform supporting said paper during the paste applying operation, cutter wheels movable beneath said main platform and adapted to cut the edges of said paper, means located beneath said main platform for folding and sealing the edges of the piece of paper carried by said movable platform, and means supported from said main platform for moving said paper.

4. A machine of the type described comprising a main platform, means for feeding paper beneath said platform, paste applying devices movable through said platform and adapted for applying paste to the paper beneath said platform, a movable platform supporting said paper during the paste applying operation, cutter wheels movable beneath said main platform and adapted to cut the edges of said paper, means located beneath said main platform for folding and sealing the edges of the piece of paper carried by said movable platform, and means supported from said main platform for moving said paper, means supported beneath said main platform for operating said cutter wheels, and an ejector beneath said platform and adapted to eject the folded and sealed piece of paper from said movable platform.

5. A machine of the type described comprising a main platform, a movable platform located beneath said main platform, means carried by the underside of said main platform and adapted to feed a piece of paper therebeneath, a paste applying device movable through said main platform and adapted to apply paste to a piece of paper upon said movable platform, revoluble cutter wheels movable beneath said main platform and guided thereby and adapted to cut the edges of the piece of paper, a knife movable beneath said main platform and adapted to sever the piece of paper from the supply roll thereof, wrapping rollers movable relatively to said movable platform and adapted to fold and seal the edges of the cut piece of paper, and an ejector in proximity to said movable platform for ejecting the wrapped and sealed piece of paper therefrom.

In testimony whereof I affix my signature in the presence of two witnesses.

ROBERT MOORE DECKER.

Witnesses:
H. C. EVERT,
MAX H. SROLOVITZ